(12) United States Patent
Lien et al.

(10) Patent No.: US 11,303,088 B2
(45) Date of Patent: Apr. 12, 2022

(54) OPTICAL FREQUENCY MANIPULATION

(71) Applicant: The University of Birmingham, Birmingham (GB)

(72) Inventors: Yu-Hung Lien, Birmingham (GB); Michael Holynski, Birmingham (GB); Lingxiao Zhu, Birmingham (GB); Kai Bongs, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 335 days.

(21) Appl. No.: 16/633,922

(22) PCT Filed: Jul. 27, 2018

(86) PCT No.: PCT/GB2018/052115
§ 371 (c)(1),
(2) Date: Jan. 24, 2020

(87) PCT Pub. No.: WO2019/021010
PCT Pub. Date: Jan. 31, 2019

(65) Prior Publication Data
US 2020/0395726 A1 Dec. 17, 2020

(30) Foreign Application Priority Data
Jul. 27, 2017 (GB) .................................. 1712072

(51) Int. Cl.
*H01S 3/10* (2006.01)
*H01S 3/00* (2006.01)
(Continued)

(52) U.S. Cl.
CPC .......... *H01S 3/0085* (2013.01); *H01S 3/0092* (2013.01); *G02F 1/2255* (2013.01); *G21K 1/006* (2013.01); *H01S 3/005* (2013.01)

(58) Field of Classification Search
CPC ....... H01S 3/0085; H01S 3/0092; H01S 3/005
See application file for complete search history.

(56) References Cited

U.S. PATENT DOCUMENTS 3,593,189 A * 7/1971 Buhrer .................. H01S 3/1398
372/32
8,941,053 B1 * 1/2015 Biedermann .......... G21K 1/006
356/450
(Continued)

OTHER PUBLICATIONS

D. Hanneke, J. Home, J. Jost, J. Amini, D. Leibfried, and D. Wineland, Nature Physics, 6, 13 (2010).
(Continued)

*Primary Examiner* — Kinam Park
(74) *Attorney, Agent, or Firm* — David D. Brush; Westman, Champlin & Koehler, P.A.

(57) ABSTRACT

An optical frequency manipulation using an optical subsystem configured to provide a modulated laser beam for interaction with an atomic sample. The optical system may include: an optical subsystem for producing a light beam, the optical subsystem having a laser source and an IQ modulator, wherein the IQ modulator is operable to modulate light from the laser source at a carrier frequency to produce modulated light having a single sideband at a sideband frequency; and a chamber for containing an atomic sample, wherein the optical subsystem is arranged to direct the light beam towards the chamber to interact with an atomic sample contained therein.

6 Claims, 7 Drawing Sheets

(51) Int. Cl.
*G02F 1/225* (2006.01)
*G21K 1/00* (2006.01)

(56) References Cited

U.S. PATENT DOCUMENTS

| | | | |
|---|---|---|---|
| 2010/0180680 | A1 | 7/2010 | Zaugg |
| 2014/0190254 | A1 | 7/2014 | Bouyer et al. |
| 2014/0319329 | A1 | 10/2014 | Bidel et al. |
| 2016/0178792 | A1 | 7/2016 | Kasevich et al. |
| 2018/0267340 | A1* | 9/2018 | Rohde .................... G02F 1/225 |
| 2018/0356338 | A1* | 12/2018 | Tanaka ................... G01N 21/39 |
| 2019/0109667 | A1* | 4/2019 | Jiang ................. H04B 10/5165 |
| 2019/0280774 | A1* | 9/2019 | Nazarathy .......... G02B 6/29362 |
| 2019/0312402 | A1* | 10/2019 | Lucas ................... G02F 1/3536 |

OTHER PUBLICATIONS

J. Chiaverini, D. Leibfried, T. Schaetz, M. Barrett, R. Blakestad, J. Britton, W. Itano, J. Jost, E. Knill, C. Langer, et al., Nature, 432, 602 (2004).
Y.-H. Lien, G. Barontini, M. Scheucher, M. Mergenthaler, J. Goldwin, and E. Hinds, Nature Communications, 7 (2016).
S. Haine, M. Olsen, and J. Hope, Physical review letters, 96, 133601 (2006).
T. Rosenband, P. O. Schmidt, D. B. Hume, W. M. Itano, T. M. Fortier, J. E. Stalnaker, K. Kim, S. A. Diddams, J. Koelemeij, J. Bergquist, et al., Physical review letters, 98, 220801 (2007).
A. Dunning, R. Gregory, J. Bateman, M. Himsworth, and T. Freegarde, Physical review letters, 115, 073004 (2015).
J. D. Thompson, T. Tiecke, A. S. Zibrov, V. Vuletić, and M. D. Lukin, Physical review letters, 110, 133001 (2013).
M. Kasevich and S. Chu, Physical review letters, 67, 181 (1991).
M. Kasevich, D. S. Weiss, E. Riis, K. Moler, S. Kasapi, and S. Chu, Physical review letters, 66, 2297 (1991).
D. L. Butts, J. M. Kinast, B. P. Timmons, and R. E. Stoner, Josa B, 28, 416 (2011).
A. Peters, K. Y. Chung, and S. Chu, Metrologia, 38, 25 (2001).
Z. Lin, X. Zong-Yuan, Y. Wei, T. Biao, P. Wen-Cui, W. Yi-Bo, X. Peng, W. Jin, and Z. Ming-Sheng, Chinese Physics Letters, 28, 013701 (2011).
J. McGuirk, G. Foster, J. Fixler, M. Snadden, and M. Kasevich, Physical Review A, 65, 033608 (2002).
K. Hardman, P. Everitt, G. McDonald, P. Manju, P. Wigley, M. Sooriyabandara, C. Kuhn, J. Debs, J. Close, and N. Robins, Physical Review Letters, 117, 138501 (2016).
G. Tino, Bulletin of the American Physical Society (2016).
C. Freier, M. Hauth, V. Schkolnik, B. Leykauf, M. Schilling, H. Wziontek, H.-G. Scheeneck, J. Müller, and A. Peters, arXiv preprint arXiv:1512 05660 (2015).
S. T. Seidel, D. Becker, M. D. Lachmann, W. Herr, and E. M. Rasel, Bulletin of the American Physical Society (2016).
B. Barrett, L. Antoni-Micollier, L. Chichet, B. Battelier, T. Léveque, A. Landragin, and P. Bouyer, Nature Communications, 7 (2016).
Z.-K. Hu, B.-L. Sun, X.-C. Duan, M.-K. Zhou, L.-L. Chen, S. Zhan, Q.-Z. Zhang, and J. Luo, Physical Review A, 88, 043610 (2013).
P. Cheinet, F. P. Dos Santos, T. Petelski, J. Le Gouet, J. Kim, K. Therkildsen, A. Clairon, and A. Landragin, Applied Physics B, 84, 643 (2006).
L. Cacciapuoti, M. de Angelis, M. Fattori, G. Lamporesi, T. Petelski, M. Prevedelli, J. Stuhler, and G. Tino, Review of scientific instruments, 76, 053111 (2005).
A. M. Marino and C. Stroud Jr, Review of Scientific Instruments, 79, 013104 (2008).
F. Theron, O. Carraz, G. Renon, N. Zahzam, Y. Bidel, M. Cadoret, and A. Bresson, Applied Physics B, 118, 1 (2015).
M. A. Kasevich, Atom interferometry in an atomic fountain, Tech. Rep. (Stanford Univ., CA (United States), 1992).
K. Takase, Precision rotation rate measurements with a mobile atom interferometer, Ph.D. thesis, Stanford University (2008).

O. Carraz, R. Charri ere, M. Cadoret, N. Zahzam, Y. Bidel, and A. Bresson, Physical Review A, 86, 033605 (2012).
P. Hamilton, M. Ja e, J. M. Brown, L. Maisenbacher, B. Estey, and H. Muller, Physical review letters, 114, 100405 (2015).
I. Dotsenko, W. Alt, S. Kuhr, D. Schrader, M. Muller, Y. Miroshnychenko, V. Gomer, A. Rauschenbeutel, and D. Meschede, Applied Physics B, 78, 711 (2004).
S.-C. Chan and J.-M. Liu, IEEE journal of quantum electronics, 42, 699 (2006).
W. Li, X. Pan, N. Song, X. Xu, and X. Lu, arXiv preprint arXiv:1607.07191 (2016).
K.-S. Lee, J. Kim, S.-B. Lee, S. E. Park, and T. Y. Kwon, Journal of the Korean Physical Society, 67, 318 (2015).
A. Meijer, G. Berden, D. Arslanov, M. Ozerov, R. Jongma, and W. van der Zande, Nature Photonics (2016).
A. B. Deb, A. Rakonjac, and N. Kjaergaard, Journal of the Optical Society of America B, 29, 3109 (2012).
S. Shimotsu, S. Oikawa, T. Saitou, N. Mitsugi, K. Kubodera, T. Kawanishi, and M. Izutsu, IEEE Photonics Technology Letters, 13, 364 (2001).
S.-i. Ohshima, T. Kurosu, T. Ikegami, and Y. Nakadan, Japanese journal of applied physics, 34, L1170 (1995).
O. Carraz, F. Lienhart, R. Charri ere, M. Cadoret, N. Zahzam, Y. Bidel, and A. Bresson, Applied Physics B, 97, 405 (2009).
Reichel, J, F Bardou, M Dahan, E Peik, S. Rand, C Salomon, and C Cohen-Tannoudji, "Raman Cooling of Cesium Below 3 nK: New Approach Inspired by Lévy Flight Statistics", Physical Review Letters vol. 75, No. 25 (1995), pp. 4575-4578.
Kasevich, M, and S Chu, "Atomic Interferometry Using Stimulated Raman Transitions", Physical Review Letters vol. 67, No. 2 (1991), pp. 181-184.
Esslinger, T, F Sander, M Weidemüller, A Hemmerich, and TW Hänsch, "Subrecoil Laser Cooling With Adiabatic Transfer", Physical Review Letters vol. 76, No. 14 (1996), pp. 2432-2435.
Vanier, J, "Atomic Clocks Based on Coherent Population Trapping: A Review", Applied Physics B, vol. 81, No. 4 (2005), pp. 421-442.
Belfi, J, G Bevilacqua, V Biancalana, S Cartaleva, Y Dancheva, and L Moi, "Cesium Coherent Population Trapping Magnetometer for Cardiosignal Detection in an Unshielded Environment", Journal of the Optical Society of America B, vol. 24, No. 9 (2007), pp. 2357-2362.
Belfi, J, G Bevilacqua, V Biancalana, Y Dancheva, and L Moi, "All Optical Sensor for Automated Magnetometry Based on Coherent Population Trapping", Journal of the Optical Society of America B, vol. 24, No. 7 (2007), pp. 1482-1489.
Schmidt-Kaier, F., J Eschner, G. Morigi, C.F. Roos, D. Leibfried, A. Mundt, and R Blatt, "Laser Cooling With Electromagnetically Induced Transparency: Application to Trapped Samples of Ions or Neutral Atoms" Applied Physics B: Lasers and Optics, vol. 73, No. 8 (2001), pp. 807-814.
Yudin, VI, AV Taichenachev, YO Dudin, VL Velichansky, AS Zibrov, and SA Zibrov, "Vector Magnetometry Based on Electromagnetically Induced Transparency in Linearly Polarized Light", Physical Review A, vol. 82, No. 3 (2010), 033807.
Fischer, R, O Firstenberg, M Shuker, and A Ron, "Atomic Magnetometry With Maximally Polarized States", Optics Express, vol. 17, No. 19 (2009), 16776-82.
Lee et al—"Single-beam atom trap in a pyramidal and conical hollow mirror", Optics Letters vol. 21, No. 15, Aug. 1, 1996.
Bigelow et al., "A Multi-Channel Turnable Source for Atomic Sensors", Visual Communications and Image Processing; Jan. 20, 2004-Jan. 20, 2004; San Jose,, vol. 9616, Sep. 1, 2015 (Sep. 1, 2015), pp. 96160K-96160K, XP060061050.
Hinton et al., "A Portable Megneto-Optical Trap with Prospects for Atom Interferometry in Civil Engineering", Roayl Society of London, Philosophical Transactions. Mathematical, Physical and Engineering Sciences, vol. 375, No. 209, Jun. 26, 2017 (Jun. 26, 2017), pp. 20160238, XP055517552.
Zhu et al., "Application of Optical Single-Sideband Laser in Raman Atom Interferometry", arxiv.org, Cornell University Library, 201 Olin Library Cornell University Ithaca, NY 14853, Jan. 12, 2018 (Jan. 12, 2018), XP080852612.

(56) References Cited

OTHER PUBLICATIONS

Pollinger et al, "Control Loops for a Coupled Dark State Magnetometer" 2010.
International Search Report and Written Opinion dated Nov. 6, 2018 for corresponding International Application No. PCT/GB2018/052115, filed Jul. 27, 2018.
Search Report dated Jan. 29, 2018 for corresponding GB Application No. 1712072.6, filed Jul. 27, 2017.
European Search report for corresponding Application No. 18752226.3, dated Nov. 13, 2020.
Savchenko et al, "Single-Sideband Electrooptic Modulators and their Application in Tunable Opto-Electronic Oscillators" (Oct. 2019).
Ortalo et al, "Atomic-ensemble-based quantum memory for sideband modulations" (Jun. 2009).

* cited by examiner

OPTICAL FREQUENCY MANIPULATION

CROSS-REFERENCE TO RELATED APPLICATIONS

This Application is a Section 371 National Stage Application of International Application No. PCT/GB2018/052115, filed Jul. 27, 2018, which is incorporated by reference in its entirety and published as WO 2019/021010 A1 on Jan. 31, 2019, in English.

FIELD OF THE INVENTION

The invention relates to optical frequency manipulation using an optical subsystem configured to provide a modulated laser beam for interaction with an atomic sample.

BACKGROUND

Two-photon stimulated Raman transition, as a tool to coherently manipulate particles with light, has been widely used in quantum information [1, 2], quantum optics [3, 4], atomic spectroscopy [5], laser cooling [6, 7] and atom interferometry [8, 9]. In relation to light-pulse atom interferometry [10], this technique promotes the development in measurements of local gravity [11, 12], gravity gradients [13], rotation, fine-structure constants, magnetic field gradients [14] and the Newtonian gravitational constant, G [15]. Recently much effort has been made to enhance the compactness and mobility of such quantum sensors, aiming to open their applicability outside the laboratory environment [16-18]. One aim is to design a compact and robust laser system to generate a Raman frequency pair. Phase noise between the two lasers for generating the pair is directly incorporated into the phase of the atom interferometry output, which limits the sensitivity of the atom interferometer [19]. Ways to reduce such phase noise would therefore be beneficial.

Few methods exist to generate a laser frequency pair with coherent phase. One possible method is to phase lock two separate lasers to an ultra-low noise reference oscillator by use of an optical phase-lock loop (OPLL) [20]. However, a phase servo system is required to achieve low residual phase noise and wide locking bandwidth of the OPLL [21, 22]. Another method is to create the Raman frequency pair from one single laser with a phase modulation technique, for example, electro-optic modulation (EOM) [23]. However, the additional laser lines generated by the modulator interfere with a position dependent Rabi frequency and phase shift [24-28]. A straightforward solution is to cancel the additional laser lines in the phase modulation, which has been demonstrated with some specific optics schemes [29-31]. These solutions, however, tend to be either complicated or bulky.

Conventional methods, such as using a conventional optical phase modulator to generate an optical double sideband modulation (ODSB) on a laser beam, tend to generate extra frequency pairs. This can create undesirable interactions that can disturb or deteriorate designated functionalities, as well as being power inefficient.

SUMMARY OF THE INVENTION

In accordance with a first aspect of the invention there is provided an optical system, comprising:
an optical subsystem for producing a light beam, the optical subsystem comprising a laser source and an IQ modulator, wherein the IQ modulator is operable to modulate light from the laser source at a carrier frequency to produce modulated light having a single sideband at a sideband frequency; and
a chamber for containing an atomic sample,
wherein the optical subsystem is arranged to direct the light beam towards the chamber to interact with an atomic sample contained therein.

The single sideband produced by the IQ modulator is at a modulation frequency with respect to the carrier frequency.

The invention relates to the application of an agile broadband optical frequency manipulation technique employing an optical IQ modulator to realize the required phase modulation while outputting only an optical single sideband with full carrier (OSSB-FC) or an optical single sideband with suppressed carrier (OSSB-SC) [34]. This technique offers the capability to swiftly change the sideband frequency over a large frequency range. The frequency range is essentially limited by the bandwidth of the modulator and also possibly the nonlinear optical frequency conversion process. The agility of the frequency change is essentially limited by the switching speed of the modulation signal. The technique offers the capabilities of coherent manipulation of quantum states and optical frequency flexibility. Applications of the invention include atom interferometry and in simple robust constructions of cold atom based devices.

An advantage of the invention is that additional laser lines can be suppressed to negligible levels by using the optical IQ modulator. This technique can for example be used to generate Raman laser frequencies to drive two-photon Raman transition with low phase noise, and any interference caused by additional laser lines can be eliminated. A further advantage is increased power efficiency compared with conventional ODSB modulation.

The IQ modulator is configured to produce a single sideband at a modulation frequency higher or lower with respect to the carrier frequency, being the frequency of the light from the laser source. The IQ modulator may be configured to modulate light from the laser source to additionally produce a carrier at a carrier frequency, i.e. for an OSSB-FC scheme, thereby generating two Raman frequencies directly from a single laser source. In such a scheme, the IQ modulator may be configured to suppress a second sideband at a second sideband frequency by at least 20 dB relative to the power of the carrier frequency. Other sidebands at multiples of the modulation frequency may also be suppressed by at least 20 dB relative to the power of the carrier frequency.

In alternative embodiments, the IQ modulator may be configured to suppress at the power of the carrier frequency by at least 20 dB relative to the single sideband, i.e. for an OSSB-SC scheme.

The optical subsystem may comprise a nonlinear optical frequency converter coupled to an output of the IQ modulator and operable to convert the modulated light. The nonlinear frequency converter allows the modulated light to be raised to a frequency range compatible for manipulating the atomic sample, for example for use with two-photon stimulated Raman transition. The nonlinear optical converter may be configured as a bandpass filter to suppress the generation of undesired optical frequencies.

In some embodiments the chamber may comprise a magneto-optical trap for containing an atom cloud. The light beam may interact with the atom cloud to cool, trap and/or launch the atoms therein. The system as a whole may be an atom interferometer. In other embodiments the chamber may contain an atomic vapour with which the light beam interacts for other purposes such as for an atomic clock, a magnetometer or laser cooling by various methods.

In accordance with a second aspect of the invention there is provided a method of generating a light beam for interaction with an atomic sample, the method comprising:

generating a light beam having a carrier frequency using a laser light source;

modulating the light beam using an IQ modulator to provide a modulated light beam having a single sideband at a sideband frequency; and directing the modulated light beam into a chamber containing the atomic sample.

The modulated light beam may comprise a carrier at the carrier frequency.

The IQ modulator may suppress a second sideband at a second sideband frequency by at least 20 dB relative to the power of the carrier frequency.

The IQ modulator may also, or alternatively, suppress the carrier frequency by at least 20 dB relative to the single sideband.

The method may further comprise directing the modulated light beam to a nonlinear optical frequency converter to convert the modulated light prior to directing the modulated light beam to the chamber.

The nonlinear optical frequency converter may suppress the generation of undesired harmonics, for example harmonics outside a bandwidth encompassing the carrier and sideband frequencies.

The chamber may comprise a magneto-optical trap containing a cold atom cloud.

DETAILED DESCRIPTION

The invention is described in further detail below by way of example and with reference to the accompanying drawings, in which.

OPTICAL SINGLE SIDEBAND GENERATION

Figure 1:
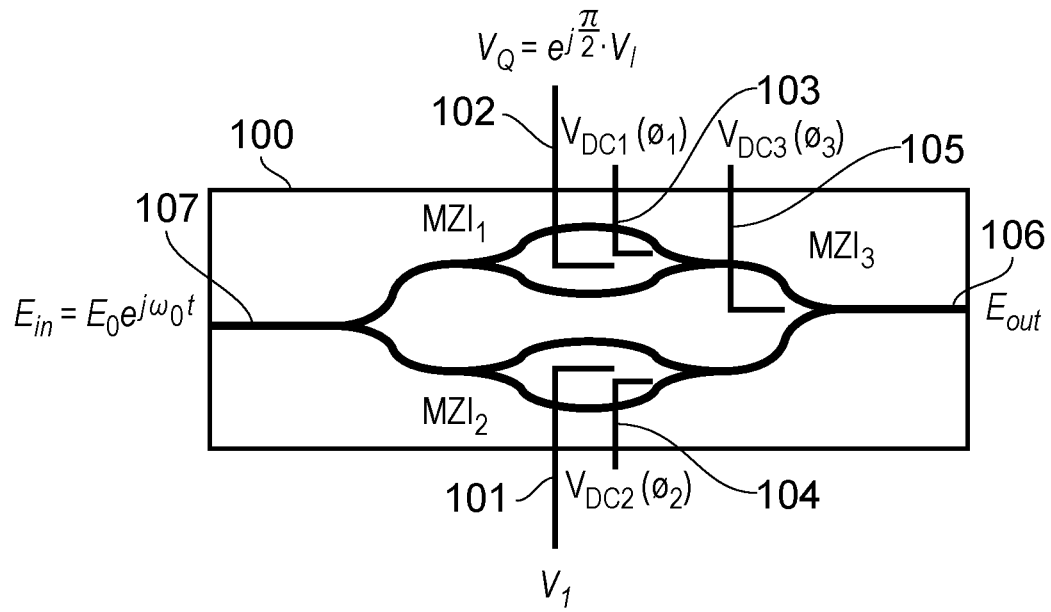
FIG. 1 is a schematic representation of an IQ modulator.

In the field of optical communications, IQ modulators are widely applied to achieve single sideband modulation. One popular implementation of IQ modulators is a dual-parallel Mach-Zehnder modulator (DP-MZM). The simplified architecture is illustrated in FIG. 1. The DP-MZM 100 comprises two parallel sub-Mach-Zehnder interferometers $MZI_1$, $MZI_2$ nested inside a third interferometer $MZI_3$. The $MZI_1$, $MZI_2$ are fed with an optical signal E, at an input port 107 and are driven via RF electrodes 101, 102 with modulation signals $V_I = V_0 e^{i\omega_m t}$ and $V_Q = V_f e^{i\Delta\Phi_e}$. The $MZI_1$, $MZI_2$ are also biased by DC voltages $V_{DC1}$, $V_{DC2}$ via respective DC electrodes 103, 104 that introduce a phase difference of $\pm\Delta\phi_{1,2}$ between the arms of the sub-MZIs. The individual arm of $MZI_1$ and $MZI_2$ is a conventional optical phase modulator, and therefore, $MZI_1$ and $MZI_2$ are effectively two phase modulators with optical phase control. $MZI_3$ is called a combiner and is biased with a DC voltage $V_{DC3}$ via DC electrode 105, which controls the optical phase delay $\Delta\phi_3$ between the output of $MZI_1$ and $MZI_2$. The spectrum of the resultant optical signal $E_{out}$ at a output port 106 can be then tailored by the appropriate control on $\Delta\phi_e$, $V_{DC1}$, $V_{DC2}$ and $V_{DC3}$ [34].

The conventional optical phase modulator essentially generates an optical double sideband modulation (ODSB) on a laser beam. The electrical field of the modulated laser beam can be expressed as:

$$E_{out} = E_0 e^{i(\omega_c t + \beta \sin \omega_m t)} \quad \text{(Eq. 1)}$$

$$= E_0 e^{i\omega_c t} \sum_0 J_n(\beta) e^{in\omega_m t}$$

$$\approx E_0 e^{i\omega_c t} [J_0(\beta) + J_1(\beta) e^{i\omega_m t} + J_{-1}(\beta) e^{-i\omega_m t}],$$

$$\beta \ll 1$$

where $\omega_c$, $\omega_m$, $\beta$, $J_n(\beta)$ are carrier frequency, modulation frequency, modulation index and Bessel functions of the first kind, respectively.

For simplicity, considering a small modulation index and assuming that both $MZI_1$ and $MZI_2$ are biased at the same point, i.e. $\Delta\phi_1 = \Delta\phi_2 = \Delta\phi_0$, and that $$\Delta\phi_e = \frac{\pi}{2},$$

the electric field at the output of an IQ modulator can be expressed as:

$$E_{out} = E_0 e^{i\omega_c t}[J_0(\beta)\cos(\Delta\phi_0/2)(1+e^{i\Delta\phi_3}) + \quad (Eq. 2)$$
$$J_1(\beta)\sin(\Delta\phi_0/2)(e^{i\pi/2}+e^{i\Delta\phi_3})e^{i\omega_m t} +$$
$$J_{-1}(\beta)\sin(\Delta\phi_0/2)(e^{i\pi/2}+e^{i\Delta\phi_3})e^{i\omega_m t}]$$

Figure 2:
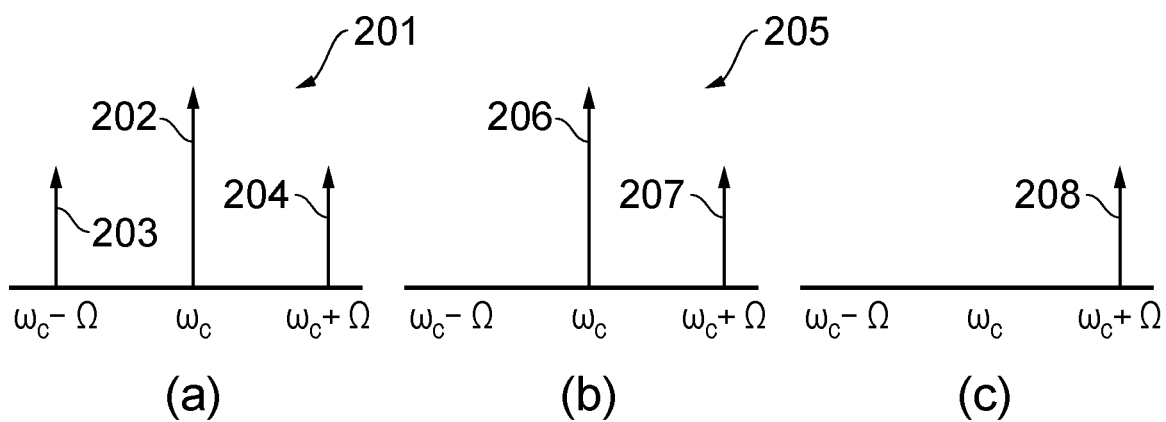
FIG. 2a is a schematic spectrum of the output from an electro-optic modulator.
FIG. 2b is a schematic spectrum of the output from an IQ modulator.
FIG. 2c is a schematic spectrum of a single sideband.
Figure 3:
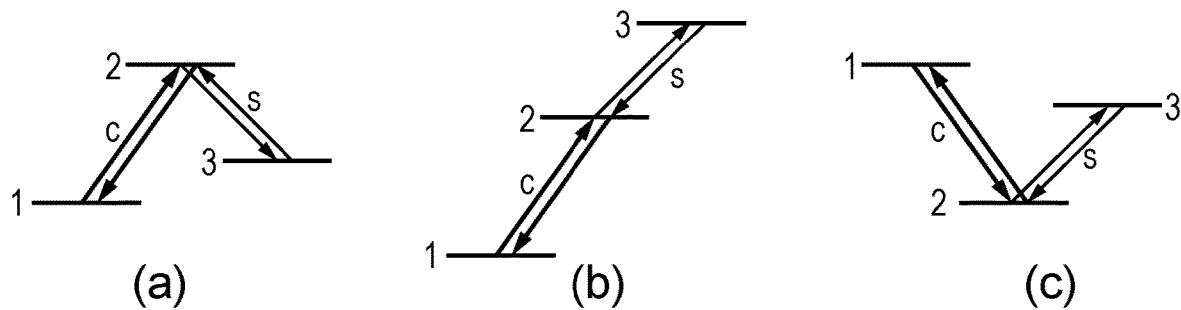
FIGS. 3a, 3b and 3c are schematic diagrams representing manipulation of quantum states via ladder (FIG. 3a), lambda (FIG. 3b) and V-shape (FIG. 3c) schemes.

Based on Eq. 2, a carrier with only +1st order (or −1st order) sideband can be created when $\Delta\phi_3=\pi/2 (\Delta\phi_3=-\pi/2)$. The power ratio between the carrier and the sideband is controlled by the modulation index $\beta$ and the phase delay $\Delta\phi_0$. Likewise, A single sideband with suppressed carrier can also be created by setting $\Delta\phi_3=\pi$. A schematic spectrum of the IQ modulator output is shown in FIG. 2, alongside the output of an optical phase modulator for comparison. The spectrum 201 (FIG. 2a) output from the phase modulator has a centre frequency 202 at $\omega_c$, and two sidebands 203, 204 at frequencies $\omega_c-\omega_m$ and $\omega_c+\omega_m$, while the spectrum 205 output from the IQ modulator has a centre frequency 206 at $\omega_c$, with only one sideband 207 $\omega_c-\omega_m$. In this first mode, which may be described as an Optical Single Sideband-Full Carrier (OSSB-FC) mode, a single sideband 207 is generated that is highly coherent with respect to the carrier 206 and also has frequency, power and phase flexibility. The OSSB-FC mode may be used to manipulate quantum states coherently via various schemes such as ladder, lambda or V-shape schemes, as illustrated in FIG. 3. FIG. 3a shows a ladder scheme, FIG. 3b a lambda scheme and FIG. 3c a V-shaped scheme. In each case quantum states 1 and 3 are manipulated via the carrier (C) and sideband (S) to and from quantum state 2. Some more advanced techniques such rapid adiabatic passage (RAP) transfer and pulse shaping/synthesis can be incorporated into these schemes to improve efficiency. Specifically in atom interferometry, the lambda scheme implemented by the OSSB-FC mode can be used to drive a Raman transition and may be implemented using optical components such as a beam splitter and mirror.

In a second mode, which may be described as an Optical Single Sideband-Suppressed Carrier (OSSB-SC) mode, illustrated in FIG. 2c, the carrier is suppressed, leaving only a single sideband 208, the effect of which is to shift the original optical frequency. This shift with respect to the original carrier may be controlled by an external frequency source, for example an RF synthesiser. One specific application of this mode is in cold atom based devices to achieve frequency multiplexing by a single laser source.

Apparatus

Figure 4:
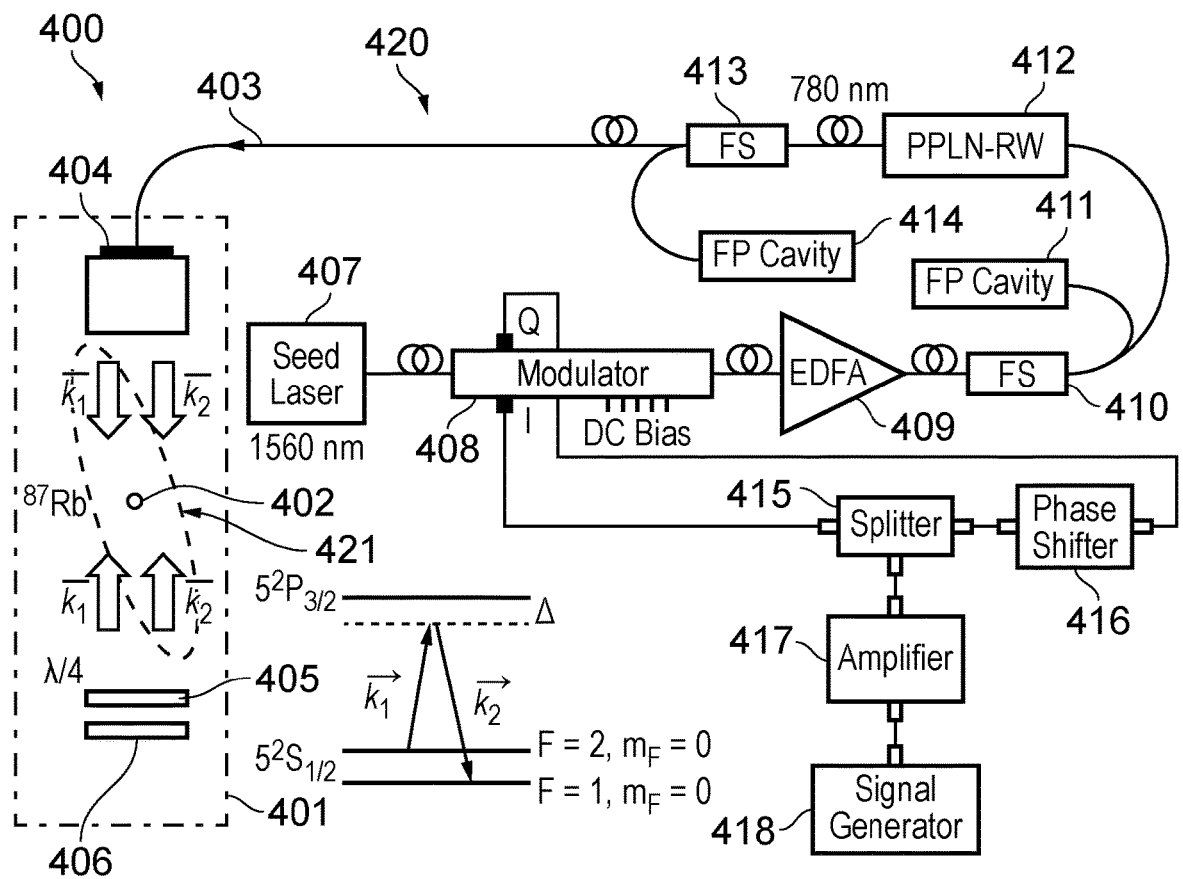
FIG. 4 is a schematic diagram of an optical system for generating a Raman laser output for a cold atom trap.

An IQ modulator may be used to generate laser frequency pairs for Raman transition in an atom interferometer. An example experimental setup is schematically shown in FIG. 4. Rubidium atoms are loaded in a 3D magneto-optical trap (MOT) within a vacuum chamber 401 and then launched into the interferometry region 402 by the moving molasses technique [35]. Light from the Raman laser 403 is directed into the vacuum chamber 401 via a Raman telescope 404, retro-reflected by an assembly of a quarter-wave plate and a high precision flat mirror 405, which is mounted on a passive vibration isolator 406. To drive a two-photon Raman transition, the light field within the chamber 401 consists of two counterpropagating beams, both of which contain two laser frequencies. Due to the Doppler effect, only one pair can excite the two-photon Raman transition. Generating the desired frequencies via a phase modulation technique ensures phase coherence because any phase noise before the retro-reflecting mirror 405 is common to both frequencies. While the atoms are in free fall within the magnetically shielded region, Mach-Zehnder atom interferometry with a set of $\pi/2-\pi-\pi/2$ Raman pulses is performed. At the output, the phase shift $\Delta\phi$ induced by gravity is given by:

$$\Delta\phi=(k_{eff}g-\alpha)T^2 \quad (Eq. 3)$$

where g is the local gravity acceleration, T is the separation time between pulses, $k_{eff}=k_1+k_2$ is the effective wavevector, and a is the chirp rate necessary to counter the Doppler shift [11].

Laser System

In the example system illustrated in FIG. 3, the Raman laser 403 is generated by a fibre-based laser system based on nonlinear frequency conversation of a laser source at 1560 nm [36]. To eliminate unwanted laser lines generated by phase modulation with an EOM, an IQ modulator 408 is specially devoted for single sideband modulation [34]. The output of the seed laser 407 is input to the IQ modulator 408, and is then amplified by an Erbium-doped fibre amplifier (EDFA) 409 before being sent into a fibre-coupled periodically poled Lithium Niobate waveguide (PPLN) 412, where the nonlinear optical frequency conversion is performed. A first fibre splitter 410 between the EDFA 409 and the PPLN 412 directs a small proportion of the light output from the EDFA 409 to a Fabry-Perot cavity 411 and the remaining proportion of light to the PPLN 412. A second fibre splitter 413 between the PPLN 412 and the Raman telescope 404 directs a small proportion of the light output from the PPLN 412 to a second Fabry-Perot cavity 414, and the remaining proportion of light to the Raman telescope 404.

The IQ modulator 408 (MXIQ-LN-40) is inserted between the seed laser 407 and EDFA 409 to create the other frequency component for two-photon Raman transition. The spectra in 1560 nm and 780 nm are monitored by respective Fabry-Perot cavities 411, 414, whose free spectral ranges (FSR) are 10 GHz and 1.5 GHz respectively. The in-phase and quadrature RF signals to drive the IQ modulator 408 originate from a signal generator 418. The output RF signal is amplified by an amplifier 417 before being split into two paths by a splitter 415. One path is sent to a phase shifter 416, where a bias phase is added before being applied to the quadrature terminal Q of the IQ modulator 408. The other path is directed to the in-phase terminal I of the IQ modulator 408.

Spectrum

The spectrum before and after the PPLN 412 is measured through the two FP cavities 411, 414. To realize a single side band, a DC bias (termed V3) input to the IQ modulator 408 is manually adjusted until the −1st sideband before the PPLN 412 is cancelled. The amplitude ratio between the carrier and the +1st sideband can be adjusted by changing the modulation index or further DC biases input to the IQ modulator 408 (termed biases V1 and V2).

Figure 5A:
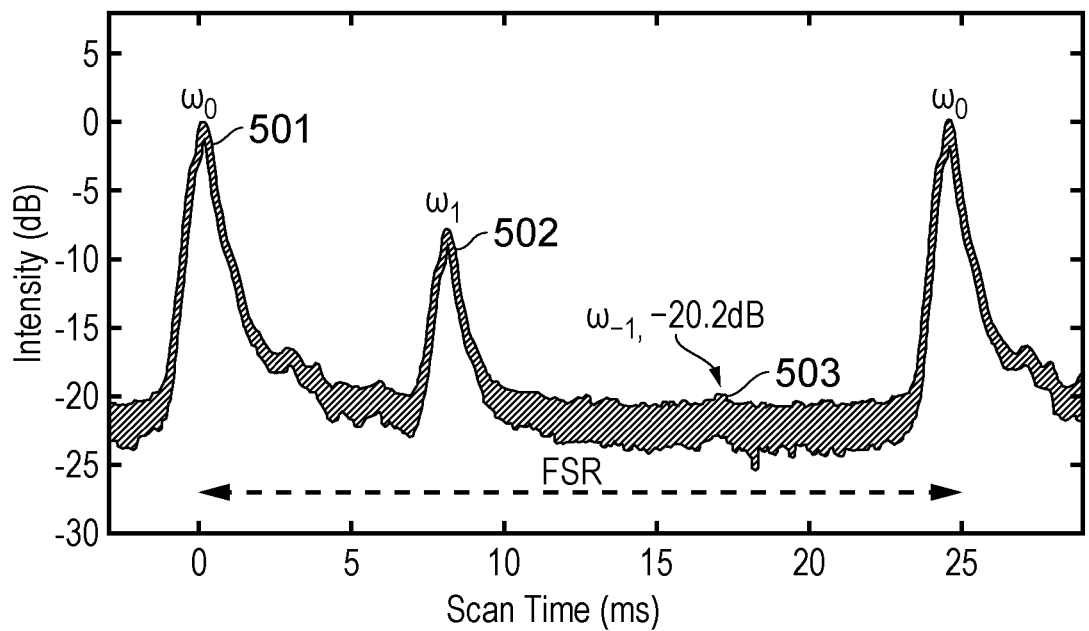
FIG. 5a is a spectrum of a single sideband with carrier optical signal prior to conversion of the second harmonic frequency by a periodically-poled lithium niobate waveguide (PPLN), with laser lines at 1560 nm.
Figure 5B:
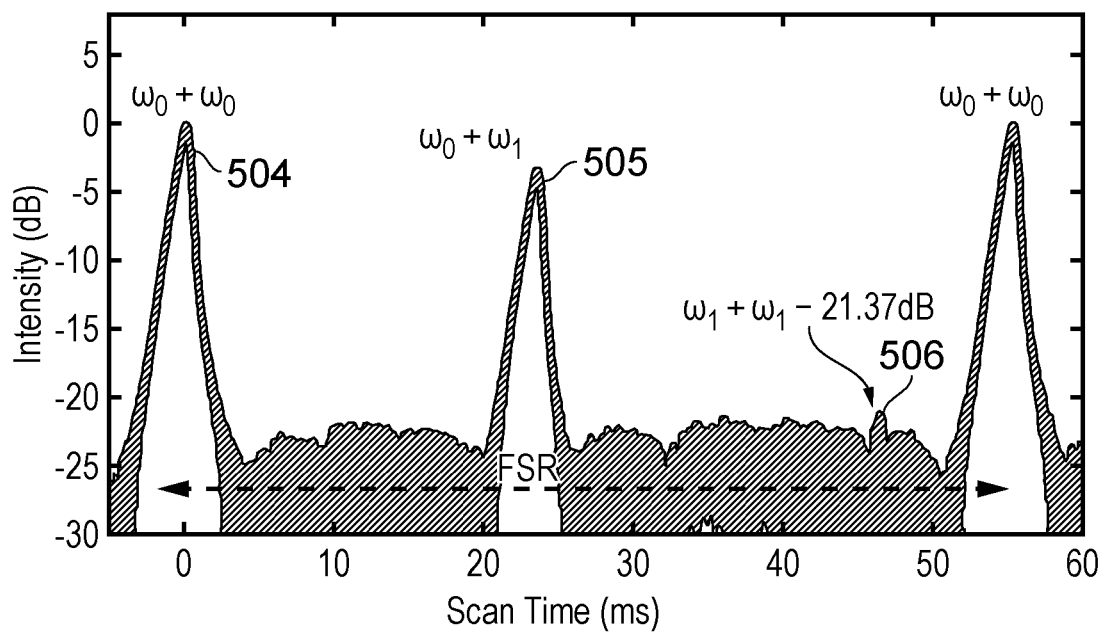
FIG. 5b is a spectrum of a single sideband with carrier optical signal after conversion of the second harmonic frequency by the PPLN, with laser lines at 780 nm.

FIG. 5a shows the spectrum of OSSB-FC at 1560 nm and FIG. 5b the spectrum at 780 nm. Before the PPLN 412, the −1st sideband 503 at $\omega_{-1}$ is suppressed at the noise level, giving a suppression of 20 dB referenced to the carrier 401 at $\omega_0$, and over 12 dB lower than the +1st sideband 502. Other higher order sidebands are much smaller and can be neglected.

After the PPLN 213, the spectrum shown in FIG. 4b contains the OSSB-FC, in which the carrier 504 and +1st sideband 505 frequencies are $\omega_0+\omega_0$ and $\omega_0+\omega_1$ respectively. An extra sideband 506 appears at $\omega_1+\omega_1$, but this is suppressed by 21 dB compared to the carrier 504. In atom interferometry, the OSSB-FC mode fits the laser spectrum requirement to drive two-photon Raman transition.

Figure 6A:
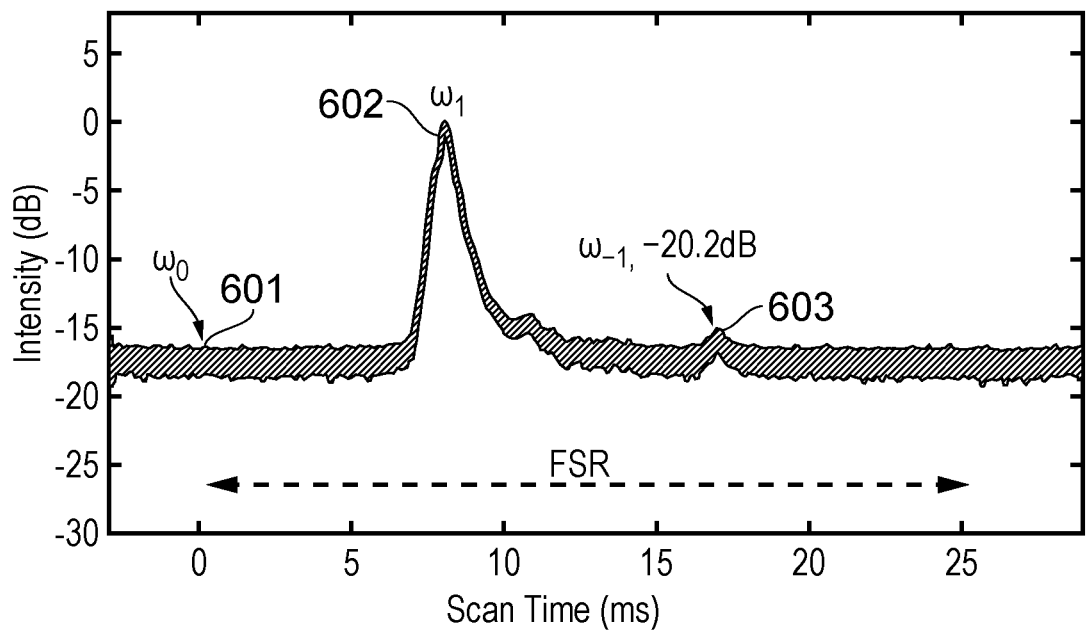
FIG. 6a is a spectrum of a single sideband with suppressed carrier optical signal prior to conversion of the second harmonic frequency by a PPLN, with laser lines at 1560 nm.
Figure 6B:
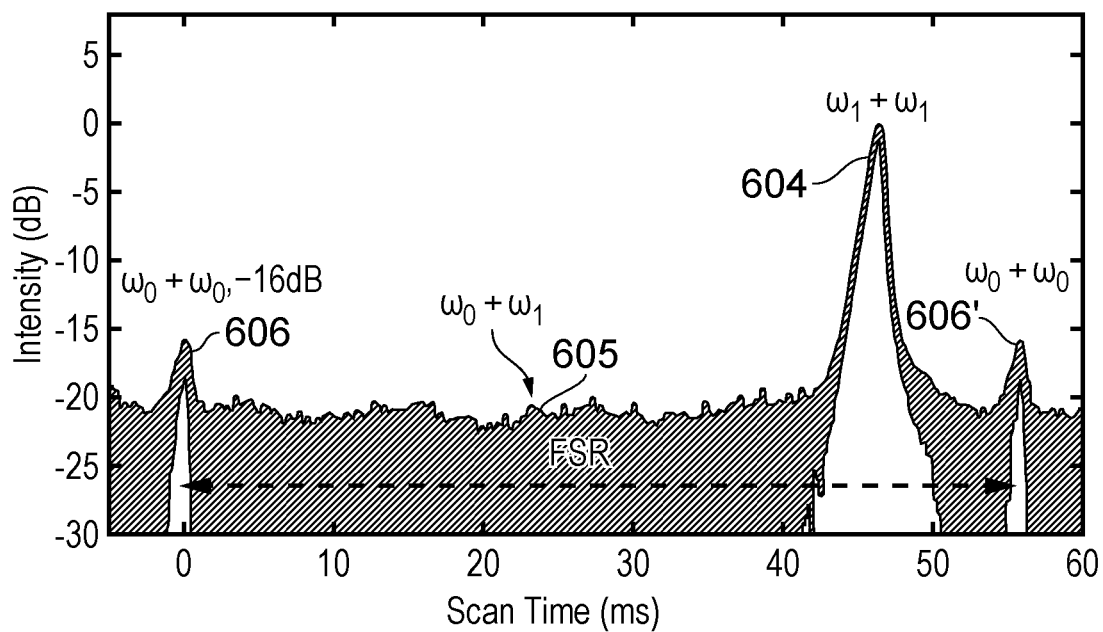
FIG. 6b is a spectrum of a single sideband with suppressed carrier optical signal after conversion of the second harmonic frequency by the PPLN, with laser lines at 780 nm.

FIGS. 6a and 6b show spectra of a single sideband with suppressed carrier (OSSB-SC). The spectrum before the PPLN, shown in FIG. 6a, has the carrier 601 at $\omega_0$ suppressed to the noise level, which is more than 17 dB lower than the +1st sideband 602 at $\omega_1$. The sideband 602 at $\omega_{-1}$, however, is at a higher level of −15 dB. This is due to the RF power added on the in-phase and quadrature ports of the IQ modulator 408 being unbalanced in the present experimental setup. After the PPLN, in the spectrum shown in FIG. 6b, the primary laser line 604 appears at $\omega_1+\omega_1$ while the sideband 605 at $\omega_0+\omega_1$ is suppressed below the noise level, which in this case is below −20 dB compared with the primary laser line 604. In addition, because laser lines exist at both $\omega_1$ and $\omega_{-1}$ before the PPLN, the nonlinear frequency conversion process subsequently generates photons with a frequency equal to $\omega_0+\omega_0$. This unwanted laser line 606 (also at 606') is 16 dB lower than the peak and could be suppressed further through improvements in the electronics. For MOTs, this OSSB-SC mode is promising for optical molasses cooling where a single tone needs to be shifted.

In general therefore, a single laser system for atom interferometry experiments has been shown, using the two modulation techniques outlined above, which can realize atom cooling and Raman transition. A single sideband with carrier is shown possible, in which additional laser lines can be suppressed to negligible levels. This technique can generate the Raman laser frequencies to drive two-photon Raman transition with low phase noise. In addition, the interference caused by additional laser lines can be eliminated, as discussed further below.

Spatially Dependent Raman Transition

In the conventional phase modulation (ODSB), there are multiple pairs of frequencies, e.g. 202-203 and 202-204 that can drive resonant two-photon Raman transitions. The effective Rabi frequency contains a spatial dependence with a periodicity of $\lambda_{rf}/2$, where $\lambda_{rf}$ is the wavelength of the RF applied on the phase modulator [24]. This means that, for Raman transition along the interferometry region, the transition condition is modified [25].

Figure 7:
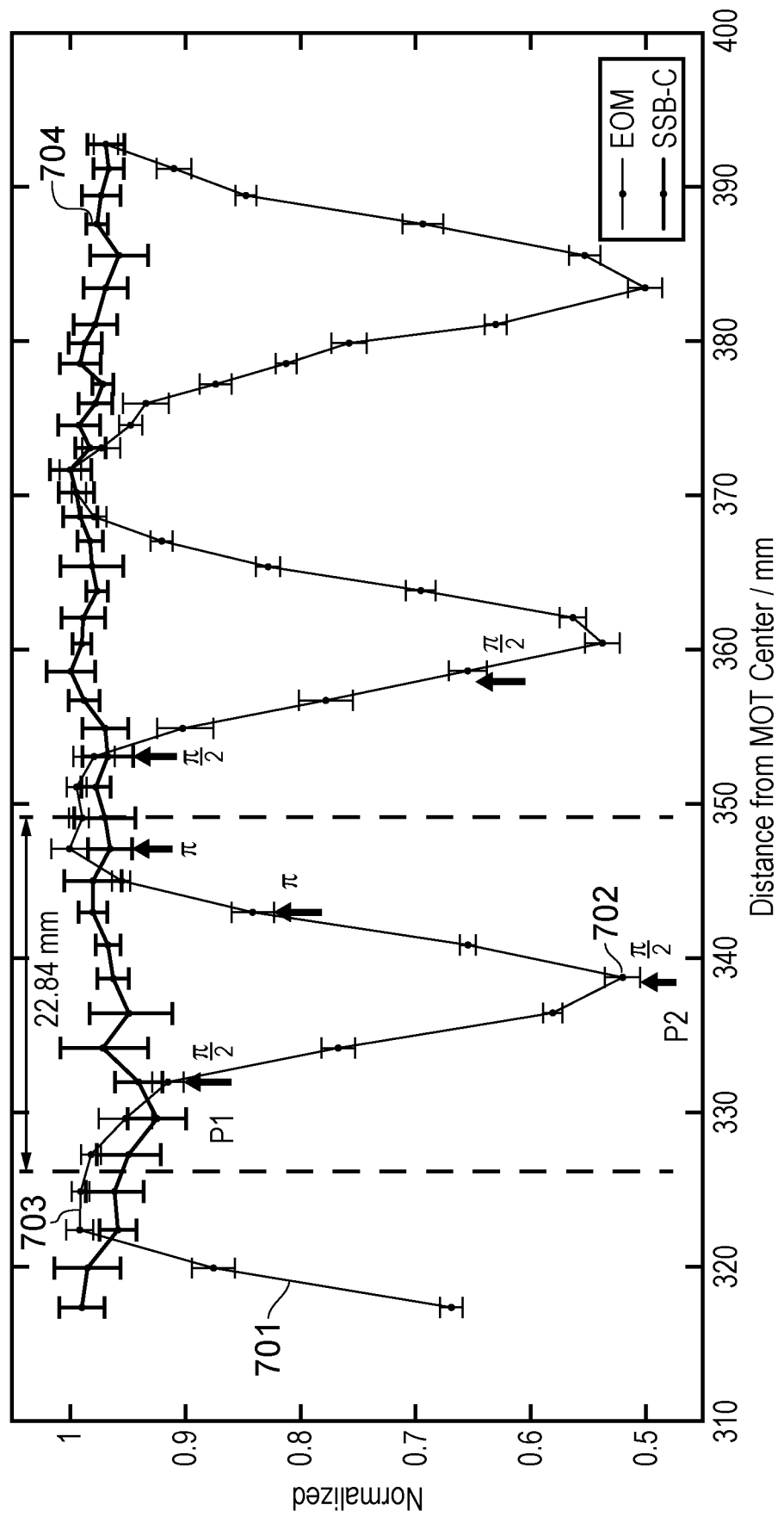
FIG. 7 is a plot of normalized amplitude of a Raman transition as a function of distance from the centre of the magneto-optical trap, comparing SSB-C with EOM for generating the Raman laser output signals.

FIG. 7 shows the spatial dependence of the Raman transition with the same pulse duration, plotting normalized Raman transition signal amplitude as a function of distance from the centre of the MOT. In the ODSB scheme, shown in trace 701, the wavelength of oscillations is measured to be around 22.38 mm which matches with the expected value of $\lambda_{rf}/2$. The amplitude of Raman transition was reduced by half at the valley 702 compared with the crest 703. The same measurement was repeated in the OSSB-FC scheme. The spatial dependence, shown by trace 704, is greatly suppressed. The fluctuation of the Raman transition is less than 5%, which is induced by other perturbations.

Phase Shift and Contrast

The spatially dependent phase shift induced by the additional laser lines in Mach-Zehnder atom interferometry [26] can be eliminated by employing a Raman laser generated by the OSSB-FC scheme. To verify this, the Mach-Zehnder atom interferometer was operated at two different positions, P1 and P2, which are indicated in FIG. 7. For comparison, the measurement was repeated with a Raman laser modulated with ODSB. Additionally, other systematic effects which may induce phase shift in the measurement (magnetic field, AC stack shift etc.) were taken into account. The interferometry region is shielded by three-layer magnetic shields, where the residual transverse magnetic field inside is less than 1 mG. Before the atom interferometry sequence starts, atoms are prepared in the magnetic insensitive state $m_F=0$. Phase shifts induced by both the first and second order Zeeman shift can be neglected. The AC stack shift can be compensated for by setting the ratio between the carrier and sideband laser to be a specific value. In our experiment, the ratio is first calculated theoretically and then adjusted based on measurement.

Figure 8A:
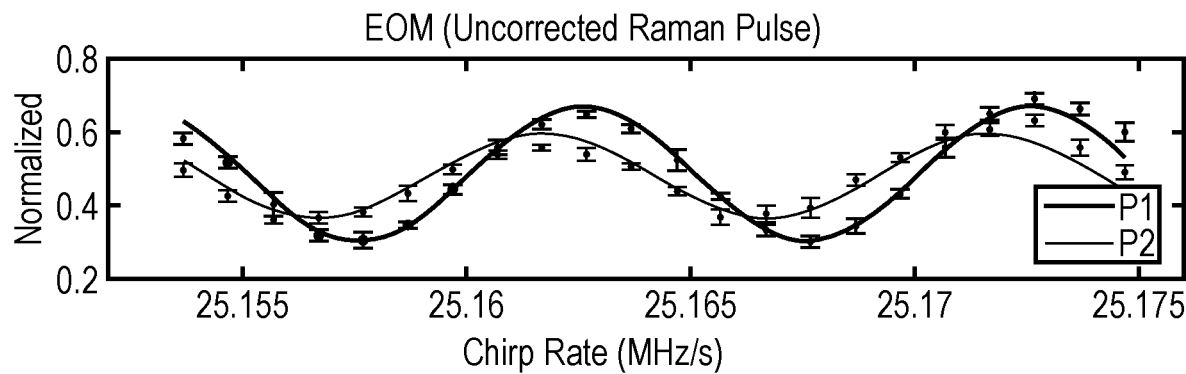
FIG. 8a is a plot of normalized amplitude as a function of chirp rate for Raman lasers generated by EOM, with a pulse duration set based on a Rabi frequency at P1.
Figure 8B:
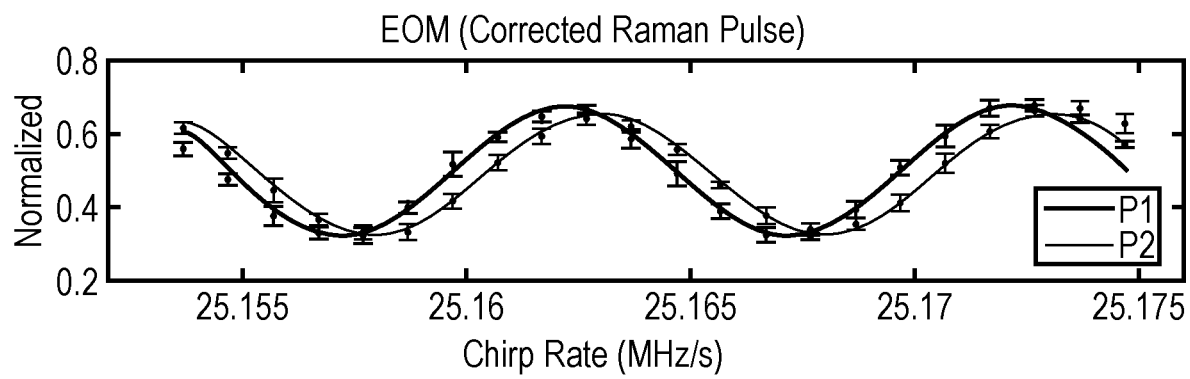
FIG. 8b is a plot of normalized amplitude as a function of chirp rate for Raman lasers generated by EOM, with the pulse duration corrected based on the local Rabi frequency.
Figure 8C:
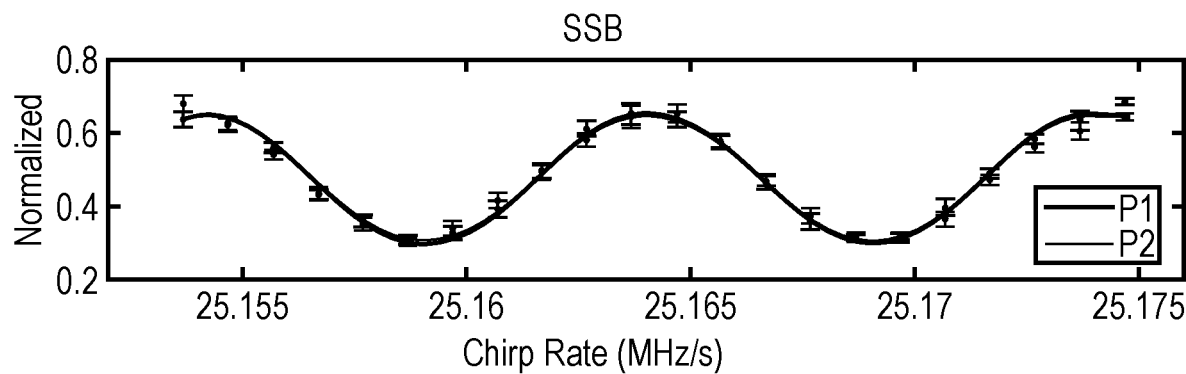
FIG. 8c is a plot of normalized amplitude as a function of chirp rate for Raman lasers generated by SSB-C, with the pulse duration set based on the Rabi frequency at P1.

FIG. 8 shows the atom interferometry fringe by sweeping the chirp rate $\alpha$ (equation 3), with the same measurement being carried out in two positions, P1 and P2 (see FIG. 7). FIG. 8a shows measurements for Raman lasers generated by ODSB and pulse duration set based on a Rabi frequency at P1. FIG. 8b shows measurements for Raman lasers generated by ODSB and the pulse duration corrected based on the spatially dependent Rabi frequency. FIG. 8c shows measurements for Raman lasers generated by OSSB-FC and the pulse duration set based on the Rabi frequency at P1. For each case, the free-fall time T was equal to 10 ms and the detuning $\Delta/2\pi$ set to be 1.9 GHz. To determine the effect of spatially varying Raman transition in the ODSB scheme, fringes in FIGS. 8a and 8b were measured in two different cases. Firstly, the Raman pulse duration was set based on the Rabi frequency at P1. Secondly, all the Raman pulse durations were corrected by the local Rabi frequencies. After fitting a sine function to the data, the phase shift and contrast were obtained. This comparison is listed in the table below, which shows the fitting results of the data plotted in FIG. 8, indicating phase shift and contrast for measurements made at P1 and P2.

| Scheme | Phase Shift (mrad) | | Contrast | |
| --- | --- | --- | --- | --- |
| | P1 | P2 | P1 | P2 |
| ODSB (U) (FIG. 7a) | 1509 | 2077 | 22% | 12% |
| ODSB (C) (FIG. 7b) | 1759 | 1294 | 20% | 19% |
| OSSB-FC (FIG. 7c) | 597 | 596 | 21% | 20% |

With the OSSB-FC scheme, the phase at P2 is shifted by only 1 mrad with a small contrast decrease of around 1% compared with the measurement at P1. This can be seen in FIG. 8c, where the two curves for P1 and P2 practically overlap with each other. With the ODSB (U) scheme, however, phase measured at P1 and P2 shift by greater amounts, being 912 mrad and 1481 mrad respectively in comparison with the phase measured in FIG. 8c. In addition, the contrast is reduced from 22% to 12% between P1 and P2, as can be seen in FIG. 8a. After correcting the Raman pulse duration, the fringe contrast at P2 can be increased to be 19% but there is still a spatial dependent phase shift at both P1 and P2, as can be seen in FIG. 8b.

Gravity Measurement

Figure 9:
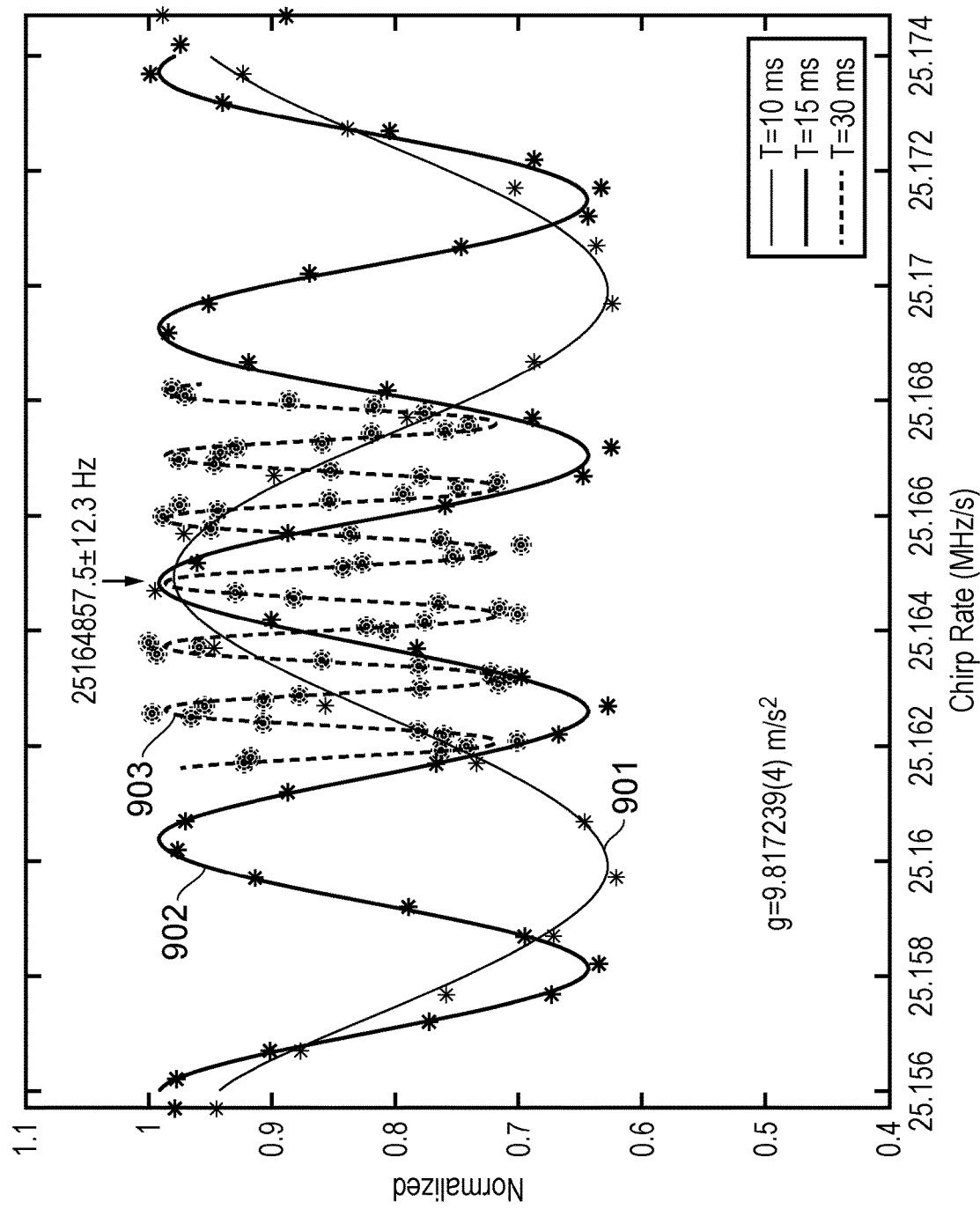
FIG. 9 is a plot of normalized amplitude as a function of chirp rate, showing Mach-Zehnder atom interference fringes for gravity measurement.

The laser system based on SSB-C has also been demonstrated to perform a gravity measurement in a Mach-Zehnder atom interferometer, which combines three velocity sensitive Raman pulses. The detuning $\Delta$ in FIG. 4 was shifted at 1.9 GHz away from transition F=2→F'=1. To compensate for the Doppler shift induced by atoms in free fall, the RF frequency was swept at a chirp rate $\alpha$. From equation 3, at a specific chirp rate, the phase shift induced by gravity acceleration is cancelled and the null is independent of T. The value of g is therefore derived from the frequency chirp rate and is given by $g=2\pi\alpha/k_{eff}$. FIG. 9 shows fringes with T equal to 10 ms (trace 801), 15 ms (trace 802) and 30 ms (trace 803) respectively. A central fringe is addressed where interferometer phase is cancelled for a Doppler compensation. After fitting the data, a value was obtained for local gravity, g=9:817239(4)ms$^{-2}$, based on the chirp rate at the central fringe of 25164858.5+/−12.3 Hz.

Alternative Implementations

The laser system may also be used to provide an output beam for various other applications in which a tuneable Raman laser output is required, including: Raman laser cooling (Reichel et al, reference 37); Raman atom interferometry (Kasevich & Chu, reference 38); laser cooling by coherent population trapping (CPT) (Esslinger et al, reference 39); CPT-based atomic clocks (Vanier, reference 40); CPT-based magnetometers (Belfi et al, references 41 & 42); laser cooling by electromagnetically-induced transparency (EIT) (Schmidt-Kaler et al, reference 43); and EIT-based magnetometry (Yudin et al and Fisher et al, references 44 & 45). In some cases (references 37-39), the laser beam may be directed to a magneto-optical trap (MOT) containing an atomic sample with which the laser beam interacts. In other cases, the laser beam may be directed to a chamber to interact with an atomic or ionic vapour contained therein (references 40-45). A common feature is that a laser beam is directed towards a chamber containing an atomic sample with which the laser beam interacts.

Other embodiments are intentionally within the scope of the invention as defined by the appended claims.

REFERENCES

[1] D. Hanneke, J. Home, J. Jost, J. Amini, D. Leibfried, and D. Wineland, Nature Physics, 6, 13 (2010).

[2] J. Chiaverini, D. Leibfried, T. Schaetz, M. Barrett, R. Blakestad, J. Britton, W. Itano, J. Jost, E. Knill, C. Langer, er al., Nature, 432, 602 (2004). [3] Y.-H. Lien, G. Barontini, M. Scheucher, M. Mergenthaler, J. Goldwin, and E. Hinds, Nature Communications, 7 (2016).

[4] S. Haine, M. Olsen, and J. Hope, Physical review letters, 96, 133601 (2006).

[5] T. Rosenband, P. O. Schmidt, D. B. Hume, W. M. Itano, T. M. Fortier, J. E. Stalnaker, K. Kim, S. A. Diddams, J. Koelemeij, J. Bergquist, er al., Physical review letters, 98, 220801 (2007).

[6] A. Dunning, R. Gregory, J. Bateman, M. Himsworth, and T. Freegarde, Physical review letters, 115, 073004 (2015).

[7] J. D. Thompson, T. Tiecke, A. S. Zibrov, V. Vuletić, and M. D. Lukin, Physical review letters, 110, 133001 (2013).

[8] M. Kasevich and S. Chu, Physical review letters, 67, 181 (1991).

[9] M. Kasevich, D. S. Weiss, E. Riis, K. Moler, S. Kasapi, and S. Chu, Physical review letters, 66, 2297 (1991).

[10] D. L. Butts, J. M. Kinast, B. P. Timmons, and R. E. Stoner, JOSA B, 28, 416 (2011).

[11] A. Peters, K. Y. Chung, and S. Chu, Metrologia, 38, 25 (2001).

[12] Z. Lin, X. Zong-Yuan, Y. Wei, T. Biao, P. Wen-Cui, W. Yi-Bo, X. Peng, W. Jin, and Z. Ming-Sheng, Chinese Physics Letters, 28, 013701 (2011).

[13] J. McGuirk, G. Foster, J. Fixler, M. Snadden, and M. Kasevich, Physical Review A, 65, 033608 (2002).

[14] K. Hardman, P. Everitt, G. McDonald, P. Manju, P. Wigley, M. Sooriyabandara, C. Kuhn, J. Debs, J. Close, and N. Robins, Physical Review Letters, 117, 138501 (2016).

[15] G. Tino, Bulletin of the American Physical Society (2016).

[16] C. Freier, M. Hauth, V. Schkolnik, B. Leykauf, M. Schilling, H. Wziontek, H.-G. Scherneck, J. Miller, and A. Peters, arXiv preprint arXiv:1512.05660 (2015).

[17] S. T. Seidel, D. Becker, M. D. Lachmann, W. Herr, and E. M. Rasel, Bulletin of the American Physical Society (2016).

[18] B. Barrett, L. Antoni-Micollier, L. Chichet, B. Battelier, T. Ldveque, A. Landragin, and P. Bouyer, Nature Communications, 7 (2016).

[19] Z.-K. Hu, B.-L. Sun, X.-C. Duan, M.-K. Zhou, L.-L. Chen, S. Zhan, Q.-Z. Zhang, and J. Luo, Physical Review A, 88, 043610 (2013).

[20] P. Cheinet, F. P. Dos Santos, T. Petelski, J. Le Goudt, J. Kim, K. Therkildsen, A. Clairon, and A. Landragin, Applied Physics B, 84, 643 (2006).

[21] L. Cacciapuoti, M. de Angelis, M. Fattori, G. Lamporesi, T. Petelski, M. Prevedelli, J. Stuhler, and G. Tino, Review of scientific instruments, 76, 053111 (2005).

[22] A. M. Marino and C. Stroud Jr, Review of Scientific Instruments, 79, 013104 (2008).

[23] F. Theron, O. Carraz, G. Renon, N. Zahzam, Y. Bidel, M. Cadoret, and A. Bresson, Applied Physics B, 118, 1 (2015).

[24] M. A. Kasevich, Atom interferometry in an atomic fountain, Tech. Rep. (Stanford Univ., CA (United States), 1992).

[25] K. Takase, Precision rotation rate measurements with a mobile atom interferometer, Ph.D. thesis, Stanford University (2008).

[26] O. Carraz, R. Charri ere, M. Cadoret, N. Zahzam, Y. Bidel, and A. Bresson, Physical Review A, 86, 033605 (2012).

[27] P. Hamilton, M. Ja e, J. M. Brown, L. Maisenbacher, B. Estey, and H. Muller, Physical review letters, 114, 100405 (2015).

[28] I. Dotsenko, W. Alt, S. Kuhr, D. Schrader, M. Muller, Y. Miroshnychenko, V. Gomer, A. Rauschenbeutel, and D. Meschede, Applied Physics B, 78, 711 (2004).

[29] S.-C. Chan and J.-M. Liu, IEEE journal of quantum electronics, 42, 699 (2006).

[30] W. Li, X. Pan, N. Song, X. Xu, and X. Lu, arXiv preprint arXiv:1607.07191 (2016).

[31] K.-S. Lee, J. Kim, S.-B. Lee, S. E. Park, and T. Y. Kwon, Journal of the Korean Physical Society, 67, 318 (2015).

[32] A. Meijer, G. Berden, D. Arslanov, M. Ozerov, R. Jongma, and W. van der Zande, Nature Photonics (2016).

[33] A. B. Deb, A. Rakonjac, and N. Kjaergaard, Journal of the Optical Society of America B, 29, 3109 (2012).

[34] S. Shimotsu, S. Oikawa, T. Saitou, N. Mitsugi, K. Kubodera, T. Kawanishi, and M. Izutsu, IEEE Photonics Technology Letters, 13, 364 (2001).

[35] S.-i. Ohshima, T. Kurosu, T. Ikegami, and Y. Nakadan, Japanese journal of applied physics, 34, L1170 (1995).

[36] O. Carraz, F. Lienhart, R. Charri ere, M. Cadoret, N. Zahzam, Y. Bidel, and A. Bresson, Applied Physics B, 97, 405 (2009).

[37] Reichel, J, F Bardou, M Dahan, E Peik, S. Rand, C Salomon, and C Cohen-Tannoudji, "Raman Cooling of Cesium Below 3 nK: New Approach Inspired By Levy Flight Statistics", Physical Review Letters Vol. 75, no. 25 (1995), pp 4575-78.

[38] Kasevich, M, and S Chu, "Atomic Interferometry Using Stimulated Raman Transitions", Physical Review Letters Vol. 67, no. 2 (1991), pp 181-84.

[39] Esslinger, T, F Sander, M Weidemuller, A Hemmerich, and TW Hansch, "Subrecoil Laser Cooling With Adiabatic Transfer", Physical Review Letters Vol. 76, no. 14 (1996), pp 2432-35.

[40] Vanier, J, "Atomic Clocks Based on Coherent Population Trapping: A Review", Applied Physics B, Vol. 81, no. 4 (2005), pp 421-42.

[41] Belfi, J, G Bevilacqua, V Biancalana, S Cartaleva, Y Dancheva, and L Moi, "Cesium Coherent Population Trapping Magnetometer for Cardiosignal Detection in an Unshielded Environment", Journal of the Optical Society of America B, Vol. 24, no. 9 (2007), pp 2357-62.

[42] Belfi, J, G Bevilacqua, V Biancalana, Y Dancheva, and L Moi, "All Optical Sensor for Automated Magnetometry Based on Coherent Population Trapping", Journal of the Optical Society of America B, Vol. 24, no. 7 (2007), pp 1482-89.

[43] Schmidt-Kaler, F., J Eschner, G. Morigi, C. F. Roos, D. Leibfried, A. Mundt, and R Blatt, "Laser Cooling With Electromagnetically Induced Transparency: Application to Trapped Samples of Ions or Neutral Atoms" Applied Physics B: Lasers and Optics, Vol. 73, no. 8 (2001), pp 807-14.

[44] Yudin, V I, A V Taichenachev, Y O Dudin, V L Velichansky, A S Zibrov, and S A Zibrov, "Vector Magnetometry Based on Electromagnetically Induced Transparency in Linearly Polarized Light", Physical Review A, Vol. 82, no. 3 (2010), 033807.

[45] Fischer, R, O Firstenberg, M Shuker, and A Ron, "Atomic Magnetometry With Maximally Polarized States", Optics Express, Vol. 17, no. 19 (2009), 16776-82.

The invention claimed is:

1. An optical system, comprising:
    an optical subsystem for producing a light beam, the optical subsystem comprising a laser source and an IQ modulator, wherein the IQ modulator is operable to modulate light from the laser source at a carrier frequency to produce modulated light having a carrier at the carrier frequency and a single sideband at a sideband frequency;
    a nonlinear optical frequency converter coupled to an output of the IQ modulator, the nonlinear optical frequency converter being configured as a bandpass filter; and
    a chamber for containing an atomic sample,
    wherein the optical subsystem is arranged to direct the light beam from the nonlinear optical frequency converter towards the chamber as a frequency pair to drive a two-photon Raman transition within an atomic sample contained therein.

2. The system of claim 1 wherein the IQ modulator is configured to suppress a second sideband at a second sideband frequency by at least 20 dB relative to the power of the carrier frequency.

3. An atom interferometer system comprising:
    an optical subsystem for producing a light beam, the optical subsystem comprising a laser source and an IQ modulator, wherein the IQ modulator is operable to modulate light from the laser source at a carrier frequency to produce modulated light having a carrier at the carrier frequency and a single sideband at a sideband frequency;
    a nonlinear optical frequency converter coupled to an output of the IQ modulator, the nonlinear optical frequency converter being configured as a bandpass filter; and
    a chamber for containing an atomic sample,
    wherein the optical subsystem is arranged to direct the light beam from the nonlinear optical frequency converter towards the chamber as a frequency pair to drive a two-photon Raman transition within an atomic sample contained therein, and wherein the chamber comprises a magneto-optical trap for containing a cold atom cloud.

4. A method of generating a light beam for interaction with an atomic sample, the method comprising:
    generating a light beam having a carrier frequency using a laser light source;
    modulating the light beam using an IQ modulator to provide a modulated light beam having a carrier at the carrier frequency and a single sideband at a sideband frequency;
    directing the modulated light beam to a nonlinear optical frequency converter to convert the frequencies of the modulated light, the nonlinear optical frequency converter operating as a bandpass filter; and
    directing the converted and modulated light beam into a chamber as a frequency pair to drive a two-photon Raman transition within an atomic sample contained in the chamber.

5. The method of claim 4 wherein the IQ modulator suppresses a second sideband at a second sideband frequency by at least 20 dB relative to the power of the carrier frequency.

6. The method of claim 4 wherein the chamber comprises a magneto-optical trap containing a cold atom cloud.

* * * * *